Henry J. Ogorzaly
Walter A. Rex
Inventors
By J. Coelman Attorney

Patented Nov. 25, 1952

2,619,451

UNITED STATES PATENT OFFICE 2,619,451

TRANSFER OF HEAT TO FLUIDIZED SOLIDS BED

Henry J. Ogorzaly, Summit, and Walter A. Rex, Westfield, N. J., assignors to Standard Oil Development Company, a corporation of Delaware Application December 28, 1948, Serial No. 67,721

4 Claims. (Cl. 202—12)

The present invention relates to the supply of heat to dense turbulent suspensions of finely divided solids fluidized by an upwardly flowing gas. A more specific aspect of the invention is concerned with the supply of heat required for the conversion of carbonaceous materials such as all types of coal, coke, lignite, peat, cellulosic materials including lignin, oil shale, tar sands, petroleum, heavy residues, pitch, asphalt, and the like, as well as liquid and gaseous hydrocarbons, into volatile fuels and valuable gases employing the fluid solids technique. Quite generally, the invention may be applied to the supply of heat required for any endothermic process carried out in a reaction zone containing a dense, turbulent, fluidized suspension of finely divided solids.

The application of the so-called fluid solids technique to the conversion of solid carbonaceous materials into volatile fuels, for example to the carbonization of carbonizable materials or the gasification of solid fuels, is well known in the art. In these processes finely divided carbonaceous materials, such as coal, having a fluidizable particle size ranging, say, from about 50 to 400 mesh, are fed to a conversion zone wherein they are maintained, at conversion temperature, in the form of a dense turbulent suspension of finely divided solids fluidized by an upwardly flowing gas. Preferably a settling zone is maintained within the upper part of the conversion zone so that the suspension of solids assumes the form of a fairly well defined bed, with a distinct interface between the dense phase, i. e. the bed, and the dilute suspension of entrained solids in the settling zone. Similarly, the fluid solids technique has been widely suggested for use in processes not involving the conversion of solid carbonaceous solids. In some applications as in the reforming of hydrocarbon gases with steam in the presence of a catalytic solid, the principal change occurs in the composition of the gases and substantially no change occurs in the solid present in the reaction zone. In other applications, as for example in the reduction of oxidic ores, the principal purpose of the reaction is to effect a desirable change in the suspended solids.

Many of the processes in which the use of the fluid solids technique in advantageous are endothermic in themselves, that is heat must be supplied if the reaction is to proceed isothermally. In addition, heat must frequently be supplied in order to bring the reactants to a practical operating temperature. Various methods of supplying the heat required in these processes have been suggested.

One method utilizes the sensible heat of heat-carrying gases such as steam, flue gases, make gas, etc., blown through the fluidized bed of solids. As a result of the low volumetric heat capacity of gases in comparison with the large quantities of heat which frequently must be supplied, application of this method would often require the use of excessively large amounts of heating gases even when these gases are supplied at the maximum feasible temperatures as permissible in view of the limited life of suitable furnace materials at high temperatures. While this method may be commercially feasible for some low temperature reactions, as for ore reductions carried out at temperatures of about 800°–1200° F., it is generally inapplicable for high temperature reactions such as water gas manufacture. In addition, in many processes the use of large volumes of heating gas is inadmissible because it complicates the recovery of desired volatile conversion products, lowers the concentration of desired components in the product gas, or interferes with the progress of the desired reaction.

Some of the disadvantages of this method may be avoided when the necessary heat is supplied by means of a limited combustion within the fluidized bed, of an injected fuel or or carbonaceous solids present in the bed. However, this method may entail the loss of considerable proportions of valuable combustible conversion products which may be unavoidably burnt in the course of the limited combustion. Moreover, the dilution of the product gases by gaseous combustion products constitutes a serious disadvantage of this procedure.

Another method of heat supply involves the use of a separate "fluid" heating zone in which the burning of a combustible portion of finely divided solid occurs or in which separately injected fuel is burned in direct contact with finely divided solid and from which a stream of the finely divided solid heated by such means to a temperature above that of the conversion zone and separated from the combustion gases is circulated to the heat-consuming conversion zone. Aside from the fact that an additional combustion reactor of considerable dimensions is required, the efficiency of heat generation by this type of combustion is not high because it has generally been found that substantial amounts of CO are formed on combustion in a "fluid" vessel. Moreover, high solids circulation rates are required, particularly at high conversion temperatures which necessitate small temperature differences between the combustion and the conversion zone since the temperature limitations imposed on such "fluid" combustion zones are substantially below those possible in gas furnaces because of the more complex type of construction and also because of the presence of solids which may fuse or soften at relatively low temperature.

It is also known to heat fluidized solids beds by passing hot combustion gases produced outside the heat transfer surfaces through heating coils immersed in the fluid bed. This method requires separate burner equipment capable of resisting extremely high temperatures unless one is satisfied with low efficiency with respect to fuel consumption and rate of heat transfer.

The present invention overcomes the aforementioned difficulties and affords additional advantages as will be fully understood from the following detailed description read with reference to the accompanying drawing.

It is, therefore, the principal object of the present invention to provide improved means for supplying heat to dense turbulent suspensions of finely divided fluidized solids.

Another object of this invention is to provide improved means for supplying the heat required for the conversion of carbonaceous materials into volatile combustibles employing the fluid solids technique, without the disadvantages discussed above.

Other and more specific objects and advantages will appear hereinafter.

Prior to the present invention it has been suggested to overcome the above mentioned difficulties by supplying heat to dense fluidized suspensions through heat transfer surfaces, such as heating coils, immersed in the bed and more specifically by generating the heat to be transferred substantially uniformly over the entire extent of the heat transfer surfaces, e. g. by a delayed combustion taking place substantially uniformly within and over the entire length of the heating coils. This method is disclosed and broadly claimed in the copending Hemminger application Serial No. 690,818, filed August 15, 1946, and assigned to the assignee of the present application. The present invention relates to valuable improvements of this method.

The heating methods disclosed in the above mentioned prior application are intended to prevent excessively high metal temperatures at any point of the heat transfer surfaces. It has now been found that in dense fluidized solids suspensions including the dense turbulent bed formed below a settling zone of the type described above, the coefficient of heat transfer from the heat transfer surface to the fluid solid is sufficiently high, over a wide range of bed temperatures, that metal temperatures in excess of practical limits are not reached even if all the heat generated is released over a small portion of the heat transfer surface at a correspondingly high temperature of the heating medium at the point of heat release.

Based on this discovery, the present invention provides for the contact of a fuel and a combustion-supporting gas with heat transfer surfaces arranged in heat exchange with a fluidized solid, in such a manner that the combustion of the fuel supply is localized near the point of inlet of the gases and a substantial temperature gradient exists in the gas in contact with the heat transfer surface. This method of operation has the advantage of extremely high average rates of heat transfer resulting from the concentration and high temperature of the heat release. In other words, it is possible to supply the same amount of heat to a body of fluidized solids at the same temperature level and with the same efficiency in fuel utilization but with a considerably smaller amount of heat transfer surface than in the case of delayed combustion extended over the length of the heat transfer surface.

The range of fluid bed temperatures within which the method of the invention may be employed to advantage largely depends on the life of the heat transfer surface at elevated temperature. Quite generally, it may be stated that the heat transfer coefficient between metal and fluid solids beds having a temperature between 800° and 1600° F. is sufficiently high to permit application of the heating method of the invention. Most of the heat resistant metallic alloys at present commercially available, e. g. alloys of iron with chromium in varying proportions along with small amounts of molybdenum, are suitable for use as the heat transfer surface over the lower range of fluidized bed temperatures, as for example from 800° to 1300° F. For the higher range of bed temperatures, e. g. from 1300° to 1600° F., the alloys of iron with chromium and nickel in substantial amounts are suitable. It will be appreciated that the temperature range within which the invention is applicable will be substantially broadened as more highly heat resistant materials become available.

The successful application of the invention depends on the fact that coefficients of heat transfer between a dense suspension or bed of fluidized solids and surface immersed in the suspension are very high. On the other hand, coefficients of heat transfer from a gaseous stream flowing past a heat transfer surface, or even from a disperse suspension of solids in such a gas are relatively low. As a consequence, the temperature of a heat transfer surface in contact with a dense, turbulent, fluid suspension of solids on the one side and with a heating gas on the other side tends to approach the temperature of the suspended solids. For example, at a bed temperature of 1100° F. and with a combustion temperature of the heating gases of 3000° F., the temperature of the heat transfer surface at the combustion zone in a typical case is about 1300°-1350° F., with a corresponding heat transfer rate of 30,000-35,000 B.t.u./hr./sq. ft.

In accordance with a preferred embodiment of the invention, the heat transfer surfaces have the form of heating tubes immersed in the fluid solids bed and fuel and air are introduced into the tubes at such high turbulence that complete combustion takes place within a short zone at the tube inlet. Preferably the ratio of air to fuel is close to the theoretical minimum for complete combustion. The heating tubes may have the form of hairpin or straight tubes. They may be arranged vertically or horizontally. A plurality of internal cores of refractory material may be provided inside the tubes; these may begin at a point substantially removed from the tube inlet and may be arranged at a progressively closer spacing as the discharge end of the tubes is approached. These cores which may, for example, have the form of cones pointing toward the tube inlet should be so arranged and dimensioned that they offer an appreciable but not excessive flow resistance to the stream of heating medium.

This arrangement affords several important advantages. The cores act as turbulence promoters to increase the convection heat transfer from hot gases to tube wall; they also act as radiation surfaces to increase the radiation heat transfer to the tube walls. Close spacing of the cores serves to increase the heat transfer rate in the cooler portions of the tubes.

Fuels suitable for the purposes of the invention include liquid and gaseous fuels of all types, such as hydrocarbon oils and gases, hydrogen, CO, or mixtures thereof, or finely divided carbonaceous solids, such as coal or coke dust, or the like. The use of finely divided solid fuel has the advantage of increased heat transfer rates by virtue of radiation resulting from the presence of hot ash and glowing carbon particles. The combustion-supporting gas may be air or oxygen or suitable mixtures thereof. The fuel and combustion-supporting gas may be preheated to any desired temperature up to the limit imposed by the maximum tolerable temperature in the combustion zone and may be supplied to the heat transfer surface in separate streams which are mixed upon contact with the heat transfer surface by means of turbulence-promoting feed devices such as injectors, baffles, restriction orifices, or the like. The fuel and combustion-supporting gas may also be premixed and, if desired, preheated to just below the ignition temperature of the mixture so that combustion takes place immediately upon contact with the hot heat transfer surfaces.

Having set forth its objects and general nature, the invention will be best understood from the more detailed description hereinafter wherein reference will be made to the accompanying drawing in which Figure 1 is a semi-diagrammatic illustration of a system suitable for carrying out an embodiment of the invention wherein the heat transfer surfaces are arranged vertically in hairpin fashion;

Figure 1:
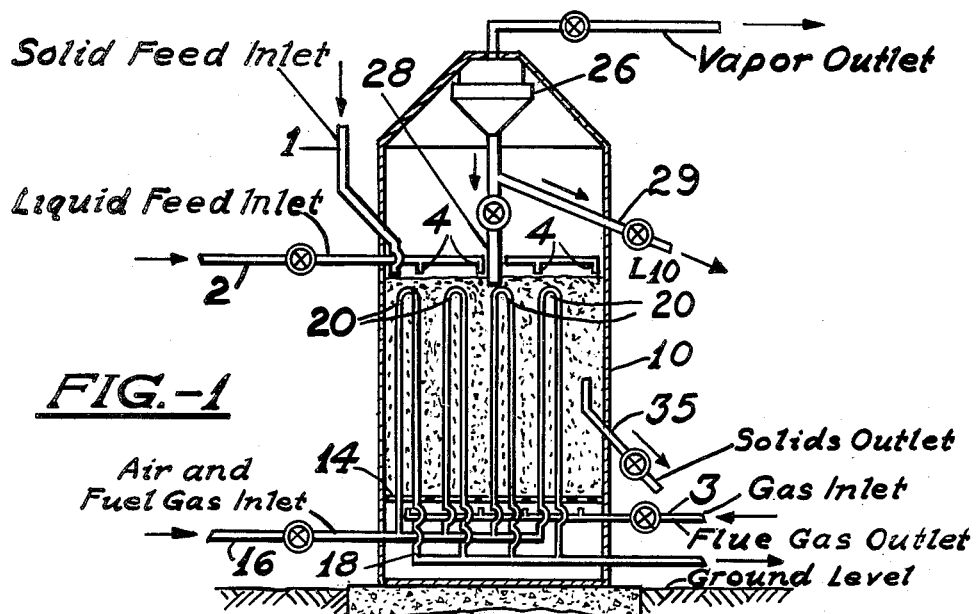

Referring now in detail to Figure 1, the numeral 10 designates a vertical, substantially cylindrical treating vessel designed for fluid solids operation. The cylindrical main section of vessel 10 is provided in its lower portion with suitable gas distributing means, such as a perforated plate or grid 14. A bank of vertical hairpin shaped heating tubes 20 is arranged so as to extend over a substantial portion of the length of vessel 10 and to be substantially evenly distributed over the cross-section of the vessel. The lower open ends of tubes 20 penetrate grid 14 into an open space below grid 14 wherein the tube inlet ends are connected to a manifold 16 for the feed of the combustion mixture and the tube discharge ends are connected to a manifold 18 for the withdrawal of flue gases.

In operation, finely divided solids having a fluidizable particle size between about 8 and 400 mesh may be supplied to vessel 10 through line 1 by any suitable means known per se in the art of fluid solids handling, such as an aerated standpipe, a pressurized or non-pressurized feed hopper, mechanical conveyors, etc. (not shown), at any preheat temperature desired. Whenever liquid materials, such as heavy oil residue, or the like, are to be contacted with solids in vessel 10, such liquids may be supplied through line 2 which may be provided with suitable sprayer heads 4 within vessel 10. The solids may be decomposable materials such as dolomitic limestone, saturated adsorbents such as char coal, silica gel, etc., carbonizable materials, carbonaceous solids to be converted into gas mixtures containing $H_2$ and/or CO, solids which are to be subjected to uniform reaction temperatures, such as catalysts for various gas phase reactions, particularly the reformation of hydrocarbons with steam and/or $CO_2$ to form mixtures of CO and $H_2$ suitable for the catalytic synthesis of hydrocarbons, inert solids such as sand, coke, etc., serving as carriers for liquids to be coked or otherwie treated, etc.

A suitable, preferably preheated, gas is introduced through line 3 into the free space below grid 14 and enters vessel 10 through grid 14 or other distributing means, at a superficial linear velocity of about 0.1–5.0 ft. per second, preferably below about 1.5 ft. per second, so as to convert the solids mass in vessel 10 into a dense, turbulent, fluidized solids suspension, preferably having a well defined upper level $L_{10}$. While any gas which does not detrimentally affect the desired treatment may be used it is preferred to employ a gas which will assist in the desired treatment, for instance by reacting with the other process materials in a desired manner or by reducing the partial pressure of products to be volatilized.

The heating of the fluidized solids bed may be effected in accordance with the invention as follows. A mixture of air and fuel gas, such as natural or refinery gas, coal gas, producer or water gas, or a suspension of coal dust in air, is supplied to manifold 16 by any conventional means in proportions closely approaching those theoretically required for complete combustion of the combustible constituent to $CO_2$ and water. This combustion mixture is fed to the inlet ends of tubes 20 preferably through individual burner tips discharging into the tubes at a point above, but adjacent to, grid 14. It will be understood that suitable means (not shown) for initiating and maintaining combustion within the tubes may be provided. This will generally take the form of a repeating electrical spark igniter located in the vicinity of the burner tip. Suitable turbulence promoting means, such as injectors or baffles, are provided at the tube inlets to ensure rapid and complete combustion of the fuel mixture over a distance corresponding to about ¼ to $\frac{1}{10}$ of the total tube length. Suitable specific means of this type will be described below in greater detail with reference to Figure 4. The heat released in this manner is transferred to the fluid solids bed at high rates which depend on the temperatures involved, but which may reach a level as high as 50,000 B. t. u./hr./sq. ft. at the inlet end of the fired tubes and which may average between 10,000 and 25,000 B. t. u./hr./sq. ft. over the entire tube surface. Due to the excellent heat transfer characteristics of the fluid bed the heat is rapidly and uniformly distributed therethrough to establish a substantially uniform temperature level throughout the bed. With a properly distributed heat transfer area the fluid solids bed may usually be uniformly heated to a temperature only about 100° to 300° F. below the exit temperature of the combustion gases.

Gaseous and/or vaporous products and/or fluidizing gas containing entrained solids fines are withdrawn overhead from level $L_{10}$ and may be passed through a gas-solids separation system such as a cyclone separator 26 from which separated solids may be returned to vessel 10 through dip-pipe 28 or discarded through line 29. Fluidized solids may be withdrawn downwardly from the fluidized bed through suitable withdrawal means 35 from any point below level $L_{10}$.

While heating tubes 20 in Figure 1 are arranged in a vertical position, it is noted that horizontal heating tubes may be preferred in many case for construction and heat transfer considerations. For example, it may be more desirable to support heating tubes 20 in the reactor walls rather than in the reactor bottom. A system of this type is illustrated in Figures 2 and 3, wherein apparatus elements equivalent to elements of Figure 1 are identified by like reference numerals.

Figure 2:
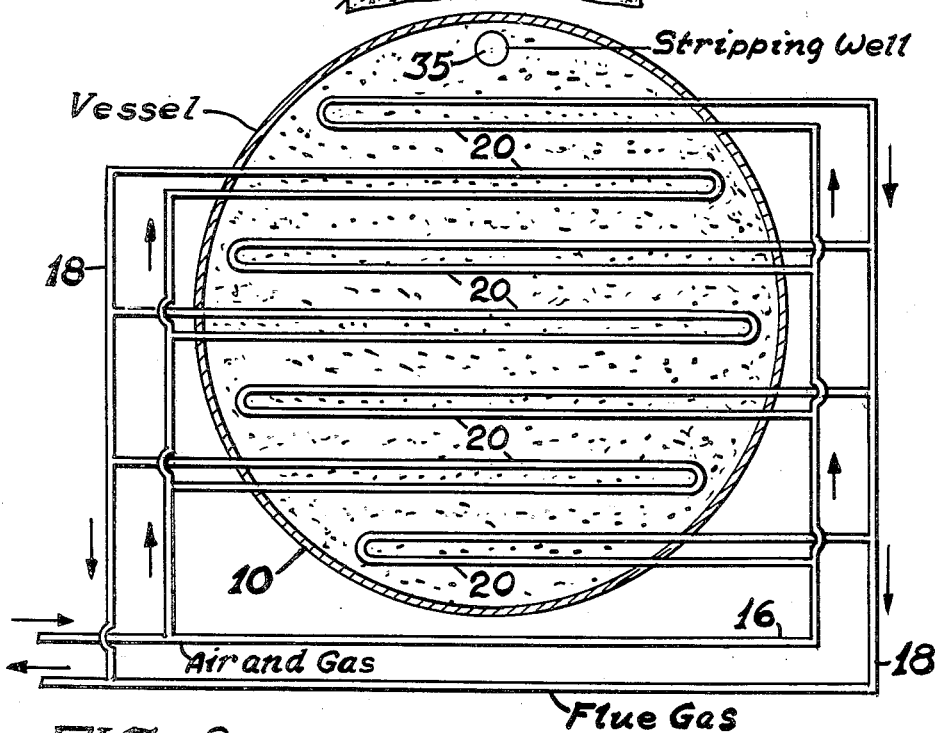
Figure 2 is a horizontal cross-section through a similar fluid-type treating vessel provided with horizontal hairpin-shaped heat supply means in accordance with the invention.

Referring now to Figure 2 there is shown therein a horizontal section through a vessel 10 which in most respects is similar to vessel 10 of Figure 1 except that tubes 20 are arranged in a horizontal position. As shown in Figure 2, tubes 20 penetrate the reactor wall alternatingly on opposite sides. Manifold 16 for the supply of the combustion mixture and manifold 18 for the withdrawal of flue gases are arranged entirely outside the reactor cross-section.

Figure 3:
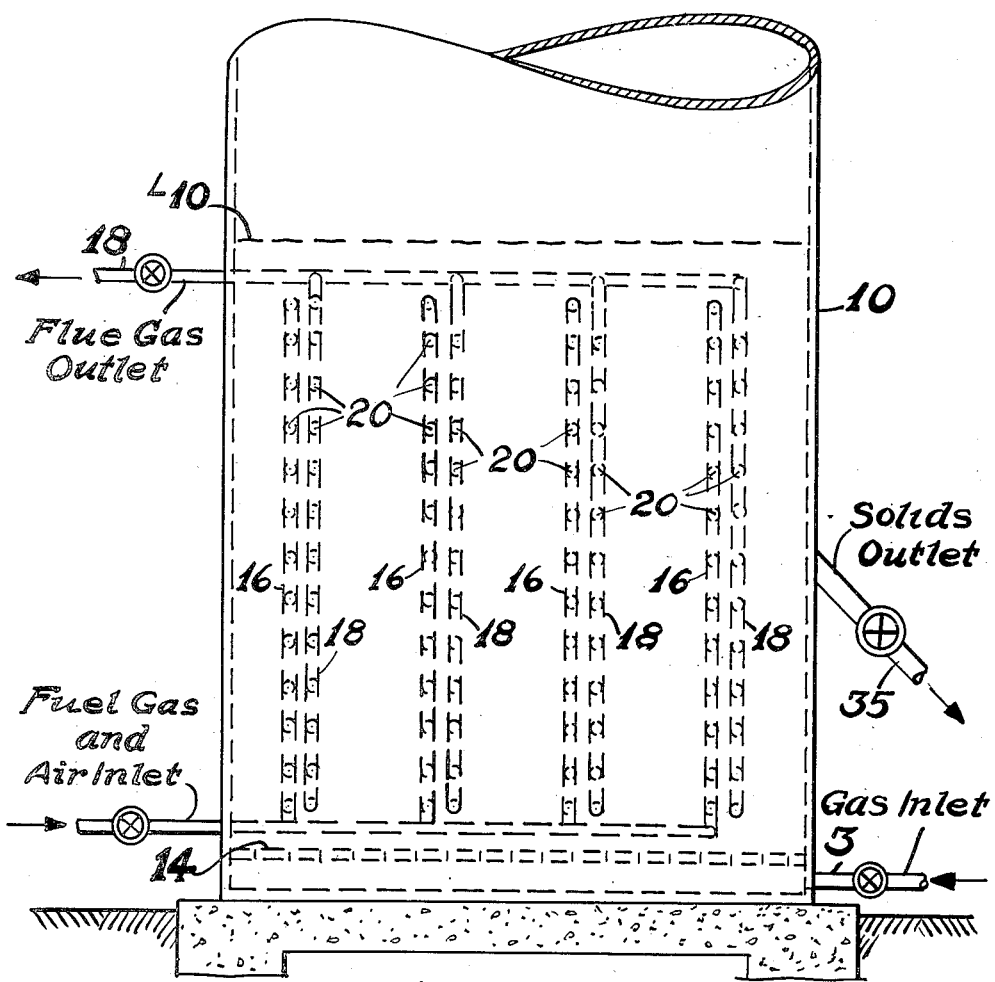
Figure 3 is a vertical cross-section through a part of the vessel illustrated in Figure 2.

Figure 3 is a longitudinal view of a vessel of the type illustrated in Figure 2. Level $L_{10}$ of the fluidized bed and distributing grid 14 are shown in this section. Points 20 indicate points at which the heating tubes penetrate the wall of vessel 10. Figures 2 and 3 may serve as illustrations of a reasonable distribution of heat transfer surfaces in the form of horizontal heating tubes over the height and width of the fluid bed. The free ends of horizontal tubes 20 within vessel 10 may be supported in any conventional manner from the top, bottom, or side wall of vessel 10. In all other respects the design and operation of the system of Figures 2 and 3 are similar to those described in connection with Figure 1.

Figure 4:
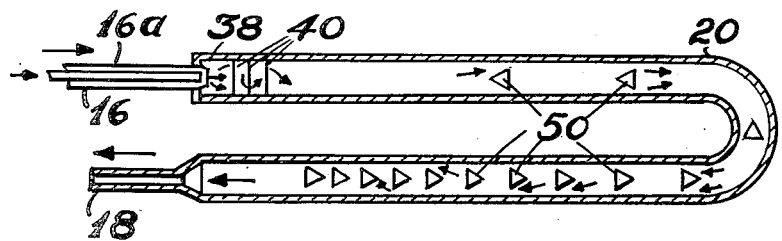
Figure 4 is a longitudinal section through a heating tube of a type preferred for the purposes of the invention.

Means particularly adapted to accomplish the concentrated heat release and improved heat transfer characteristics of the present invention are illustrated in Figure 4 which is a longitudinal section through a preferred modification of heating tubes of the type shown in Figures 1-3, drawn on an enlarged scale for a better understanding of various details. As indicated in Figure 4, the combustion mixture of fuel and air may be injected from manifold 16 into the inlet end of a tube 20 by means of a conventional injector nozzle 38 whose discharge into the tube affords excellent mixing and high turbulence of the gas mixture. Additional turbulence promoting devices, such as radial baffles 40, may be arranged close to the tube inlet end. Successive radial baffles are preferably offset rotationally in order to promote mixing. These baffles are preferably ceramic or other heat resistant constructions but may also be made of metallic alloys thermally well bonded to the tube wall. Further downstream in the tubes, refractory cones or other inserts 50 may be supported by any suitable means permitting flue gases to pass thereover but promoting turbulent flow of the gases. The spacing of inserts 50 preferably is reduced toward the tube outlet as schematically indicated on the drawing. In this manner, not only is sufficient turbulence maintained over the entire tube length but also additional radiation surface is provided in increased proportion as the temperature of the flue gases decreases, thus improving the rate of heat transfer.

Concentrated burning of the fuel in the spirit of the invention may also be promoted by adjusting the ratio of air to fuel in the direction of a leaner fuel mixture than the theoretical ratio for complete combustion.

While the supply of a premixed combustion mixture to manifold 16 and tubes 20 has been referred to in the above description of Figures 1-4 it is noted that fuel and combustion-supporting gas may be fed separately to tubes 20. For example, in Figure 4 the fuel may be supplied through line 16a in the form of a gas, liquid or dust and the air may be fed through line 16 and nozzle 38 in a manner suitable to obtain the desired mixing and turbulence at the nozzle outlet.

When the systems illustrated by the drawing are used for the distillation or low temperature carbonization of carbonizable solids, vessel 10 should be filled with a dry fluidizable solid, preferably coke or other solid carbonization residue, such as spent oil shale or tar sand, which is kept at the desired carbonization temperature of about 800°-1200° F. with the aid of tubes 20. For this purpose generally about 500,000-1,000,000 B. t. u./ton of carbonizable solids feed must be generated in tubes 20 to effect carbonization. The carbonizable feed is supplied through line 1 into the hot, dry, fluidized solids bed at a rate which will prevent substantial caking within vessel 10. In case the particles tend to build up in size during the operation, solids may be withdrawn through line 35, ground and returned through line 1. Carbonized solid may be recovered through line 35 at the rate at which it is produced. Steam, inert gas or product gas may serve as the fluidization gas preferably at a superficial velocity of about the order of 0.5 to 5.0 ft. per second assuming solids particle sizes of about 8-100 mesh to establish apparent bed densities of about 10-50 lbs. per cu. ft. Carbonization pressures may range from atmospheric to 200 lbs. per sq. in., preferably below 50 lbs. per sq. in. gauge.

A similar procedure may be used for coking heavy oil residue and other hydrocarbonaceous materials liquid at the treating conditions. In this case the liquefied feed may be supplied through line 2 preferably in a finely divided form, for instance by means of suitable sprayer heads to a fluidized solids bed of the type and temperature specified above. Finely divided inert fluidized solids, such as sand or clay varying in particle size from 50-400 mesh may be used particularly during the starting period.

When it is desired to produce gas mixtures containing $H_2$ and $CO$, such as feed gases for the catalytic synthesis of hydrocarbons and other valuable products, from liquid or solid carbonaceous materials, the procedures described above may be substantially followed with the exception that higher temperatures have to be used and steam and/or $CO_2$ must be supplied to the fluidized solids bed in amounts sufficient for the reaction. If high reactivity carbonaceous starting materials, such as char obtained in fluid-type low temperature carbonization, certain lignites, etc., are employed temperatures of about 1600°-1700° F. are sufficient for satisfactory operation particularly at elevated pressures of about 200-400 lbs. per sq. in.

The system of Figures 1-4 may also be used for the reformation of hydrocarbons, particularly hydrocarbon gases such as natural gas, refining gas or the like, with steam and/or $CO_2$ in the presence of suitable catalysts to produce $H_2$ or mixtures of $H_2$ and CO of the type mentioned above. In this case, vessel 10 contains a finely divided reformer catalyst such as nickel oxide supported on magnesia, alumina and/or silica, of fluidizable particle size and a mixture of steam and/or $CO_2$ with the gas to be reformed is introduced through line 3. Tubes 20 may be maintained at a maximum temperature of about 1600°–1800° F. by combustion of gaseous or finely divided solid fuel to establish a suitable reformation temperature of about 1200°–1600° F. in the fluid bed of vessel 10.

Other catalytic or non-catalytic high temperature treatments may be carried out in the systems of Figures 1–4 in a substantially analogous manner as will be apparent to those skilled in the art. While tubes 20 have been shown in the form of hairpin tubes, it will be understood that straight tubes provided with feed and discharge headers in a conventional manner may be likewise employed. Various other modifications of the systems described above may be made without deviating from the spirit of the invention.

The invention will be further illustrated by the following specific example applying to the low temperature carbonization of bituminous coal.

Example

| | |
|---|---|
| Coal feed, tons/day (100% thru 8 mesh) | 1,000 |
| Moisture content of coal, per cent $H_2O$ | 5 |
| Coal feed rate to vessel, lbs./hr./sq. ft. of bed cross-sectional area | 630 |
| Carbonizing temperature, °F | 900 |
| Bed height, ft | 22 |
| Carbonizing pressure, p. s. i. g | 1 |
| Fuel required, s. c. f. m. by-product gas (860 B.t.u./s. c. f.) | 1,060 |
| Air required, s. c. f. m | 9,900 |
| Steam for fluidizing, lbs./hr | 7,060 |
| Heating surface of tubes, sq. ft | 2,800 |
| Number of hairpin tubes required | 142 |
| Tube diameter, inches | 4 |
| Maximum tube metal temperature, °F | 1,300 |
| Exit combustion gas temperature, °F | 1,190 |
| Average heat transfer rate thru tubes, B. t. u./hr./sq. ft | 12,500 |
| Yields: | |
| Coke, tons/day | 716 |
| Recovered tar, tons/day | 102 |
| Net by-product gas, s. c. f./day (860 B. t. u./s. c. f.) | 750,000 |

The foregoing description and exemplary operations have served to illustrate specific applications and results of the invention but are not intended to be limiting in scope.

What is claimed is:

1. The method of supplying heat to a dense turbulent mass of finely divided solids fluidized by an upwardly flowing gas and subjected to a high temperature within the range of about 800°–1700° F. in a treating zone, which comprises supplying a premixed combustion mixture to one end of a confined extended space bounded by a heat transfer surface of high thermal conductivity wholly immersed in said fluidized mass, igniting said combustion mixture within said space at a point adjacent said supply end while in contact with a portion of said surface, which is wholly bounded by said mass, maintaining the ratio of combustion-supporting gas to fuel in said mixture at the theoretical minimum for complete combustion of said fuel, maintaining said mixture in a state of extreme turbulence immediately subsequent to said point of ignition by passing the mixture through a tortuous path within said space, substantially completely burning said fuel in a short flame within the immediate neighborhood of said point of ignition at temperatures in the neighborhood of about 3000° F. so as to maintain said bed at said first-named high temperature, and withdrawing flue gas from the other end of said space.

2. The method of claim 1 in which said mass comprises carbonaceous constituents.

3. The method of claim 2 in which said constituents are solid at said temperature.

4. The method of claim 2 in which said constituents are carbonizable and said temperature is a carbonization temperature.

HENRY J. OGORZALY.
WALTER A. REX.

REFERENCES CITED

The following references are of record in the file of this patent:

UNITED STATES PATENTS

| Number | Name | Date |
|---|---|---|
| 2,115,769 | Harris | May 3, 1938 |
| 2,122,504 | Wilson | July 5, 1938 |
| 2,281,847 | Koppers | May 5, 1942 |
| 2,346,991 | Otto | Apr. 18, 1944 |
| 2,364,145 | Huppke et al. | Dec. 5, 1944 |
| 2,478,912 | Garbo | Aug. 16, 1949 |
| 2,516,974 | Garrison | Aug. 1, 1950 |